(12) United States Patent
Konet et al.

(10) Patent No.: US 7,387,397 B2
(45) Date of Patent: Jun. 17, 2008

(54) VEHICLE BACKLIT PANEL

(75) Inventors: Heather S. Konet, Canton, MI (US);
Jason M. Gray, Commerce Township, MI (US); Michael R. Miller, Commerce Township, MI (US); Jennifer J. Sterling, Livonia, MI (US)

(73) Assignee: Nissan Technical Center North America, Inc. MI (US)

( * ) Notice: Subject to any disclaimer, the term of this patent is extended or adjusted under 35 U.S.C. 154(b) by 118 days.

(21) Appl. No.: 11/210,806

(22) Filed: Aug. 25, 2005

(65) Prior Publication Data

US 2007/0047217 A1   Mar. 1, 2007

(51) Int. Cl.
*F21V 9/16* (2006.01)

(52) U.S. Cl. ............ 362/84; 362/812; 362/603; 362/604; 362/605; 40/541; 40/544; 40/551

(58) Field of Classification Search .......... None
See application file for complete search history.

(56) References Cited

U.S. PATENT DOCUMENTS

| 2,529,713 | A | * | 11/1950 | Thurston | 362/604 |
| 5,747,756 | A | | 5/1998 | Boedecker | |
| 5,939,979 | A | * | 8/1999 | Lee | 340/479 |
| 6,190,026 | B1 | * | 2/2001 | Moore | 362/487 |
| 6,464,381 | B2 | | 10/2002 | Anderson, Jr. et al. | |
| 6,517,226 | B1 | | 2/2003 | Zimmermann et al. | |
| 6,641,276 | B1 | | 11/2003 | Macher et al. | |
| 6,700,584 | B1 | * | 3/2004 | Wood | 345/581 |
| 6,773,129 | B2 | * | 8/2004 | Anderson et al. | 362/84 |
| 6,854,872 | B2 | * | 2/2005 | Davenport | 362/565 |
| 7,182,492 | B1 | * | 2/2007 | Walter | 362/497 |
| 2001/0030871 | A1 | * | 10/2001 | Anderson et al. | 362/488 |
| 2001/0053082 | A1 | * | 12/2001 | Chipalkatti et al. | 362/496 |
| 2002/0159246 | A1 | * | 10/2002 | Murasko et al. | 362/84 |
| 2003/0002273 | A1 | | 1/2003 | Anderson, Jr. et al. | |
| 2003/0035917 | A1 | * | 2/2003 | Hyman | 428/67 |
| 2004/0217691 | A1 | | 11/2004 | Opelka et al. | |
| 2005/0040769 | A1 | | 2/2005 | Enz | |

* cited by examiner

*Primary Examiner*—Sandra O'Shea
*Assistant Examiner*—Danielle Dunn
(74) *Attorney, Agent, or Firm*—Global IP Counselors (57) ABSTRACT

A vehicle backlit panel includes a base substrate, an electroluminescent element and an outer substrate. The electroluminescent element is disposed on one side of the base substrate. The outer substrate overlies the electroluminescent element. The outer substrate includes a translucent substrate portion having areas of different thicknesses as measured in a direction of illumination through the outer substrate to form a three-dimensional graphic image with a three-dimensional appearance resulting from different translucency levels of the areas of different thicknesses.

24 Claims, 7 Drawing Sheets

VEHICLE BACKLIT PANEL

BACKGROUND OF THE INVENTION

1. Field of the Invention

The present invention generally relates to a vehicle backlit panel. More specifically, the present invention relates to a vehicle backlit panel having an electroluminescent element that provides backlighting to an outer substrate formed with a three-dimensional image.

2. Background Information

Vehicles are typically provided with various types of decorative trim portions, such as real wood finishes on doors or radio bezels with chrome laminated film trim. Such trim portions are not noticeable in darker conditions.

In view of the above, it will be apparent to those skilled in the art from this disclosure that there exists a need for improved decorative elements that are visually appealing and that can be illuminated. This invention addresses this need in the art as well as other needs, which will become apparent to those skilled in the art from this disclosure.

SUMMARY OF THE INVENTION

It has been discovered that to illuminate a trim element on a vehicle, electroluminescent elements can be used to provide subtle lighting accents to enhance the visual appearance of a vehicle.

One object of the present invention is to provide a three dimensional image within a trim element or trim panel that is primarily visible when backlit by an electroluminescent element.

In one aspect of the present invention, a vehicle backlit panel includes a base substrate, an electroluminescent element and an outer substrate. The electroluminescent element is disposed on one side of the base substrate. The outer substrate overlays the electroluminescent element. The outer substrate includes a translucent substrate portion having areas of different thicknesses as measured in a direction of illumination through the outer substrate to form a three-dimensional graphic image with a three-dimensional appearance resulting from different translucency levels of the areas of different thicknesses.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
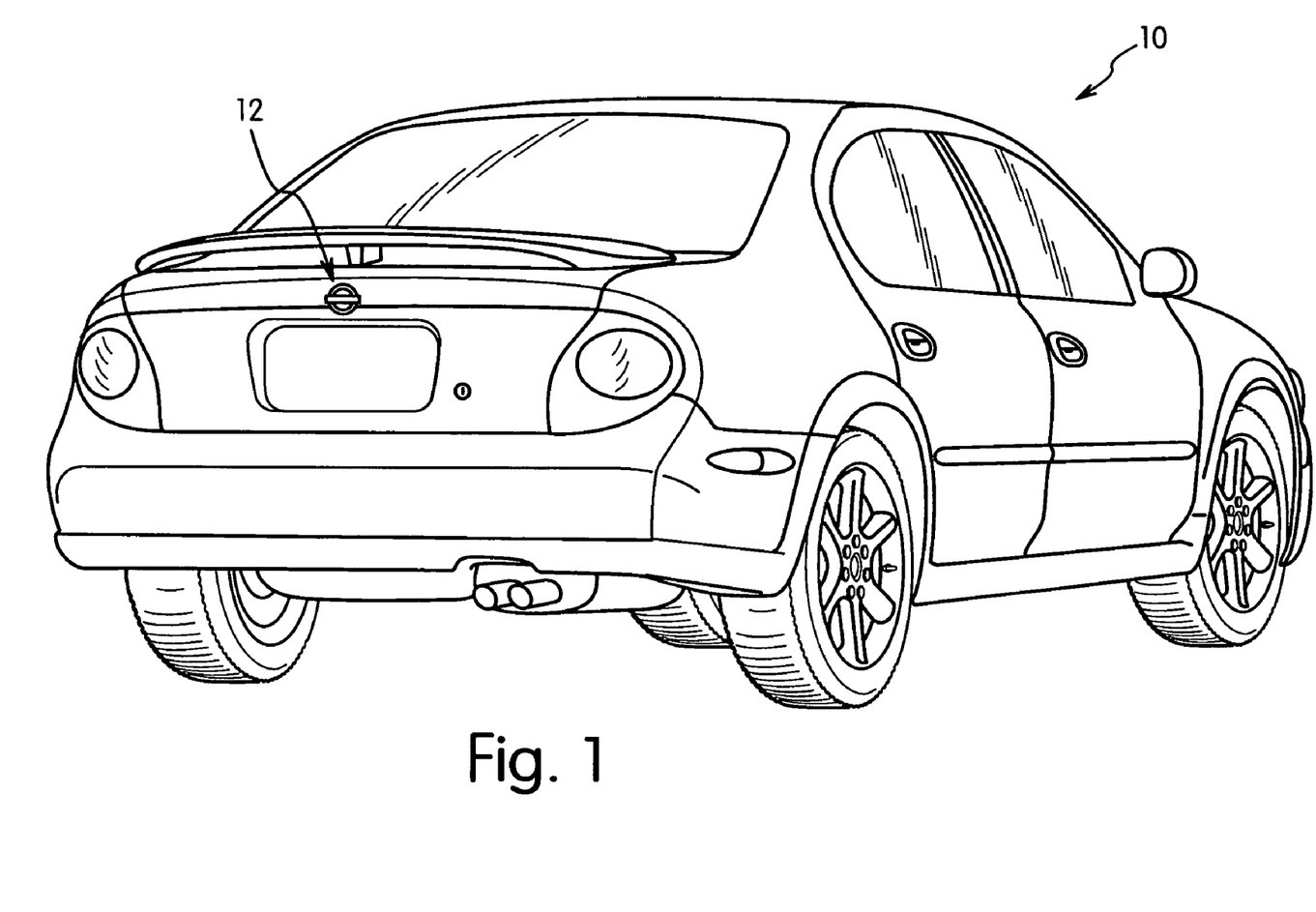
FIG. 1 is a rear perspective view of a vehicle that includes an exterior backlit panel in accordance with the present invention.
Figure 2:
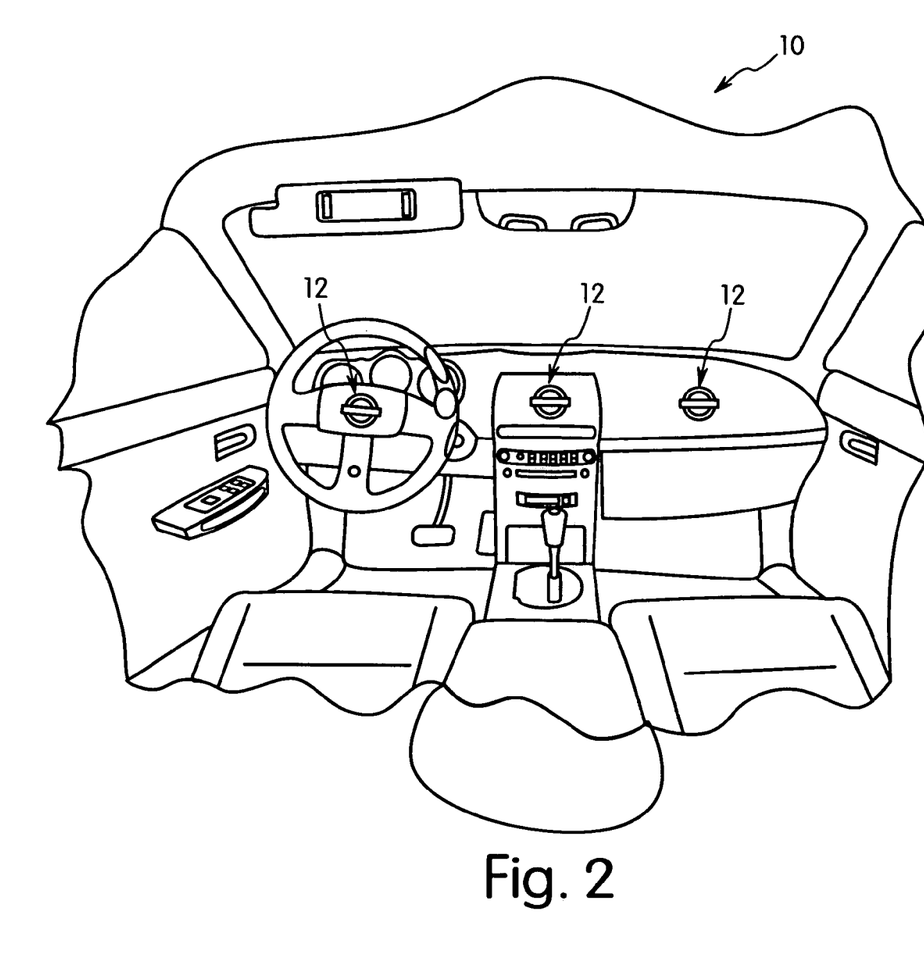
FIG. 2 is a perspective view of an interior of the vehicle depicted in FIG. 1, showing a plurality of interior backlit panels in accordance with the present invention.

Referring initially to FIGS. 1 and 2, a vehicle 10 is illustrated that is equipped with a plurality of vehicle backlit panels 12 in accordance with a first embodiment of the present invention. As shown in FIG. 1, one of the vehicle back lit panels 12 is installed as part of an exterior portion of the vehicle 10. As shown in FIG. 2, one or more vehicle backlit panels 12 are installed as part of various interior portions of the vehicle 10. The basic configurations of the vehicle backlit panels 12 are the same for each of the vehicle backlit panels 12. Thus, only one of the vehicle backlit panels 12 will be discussed and/or illustrated in detail herein.

Figure 3:
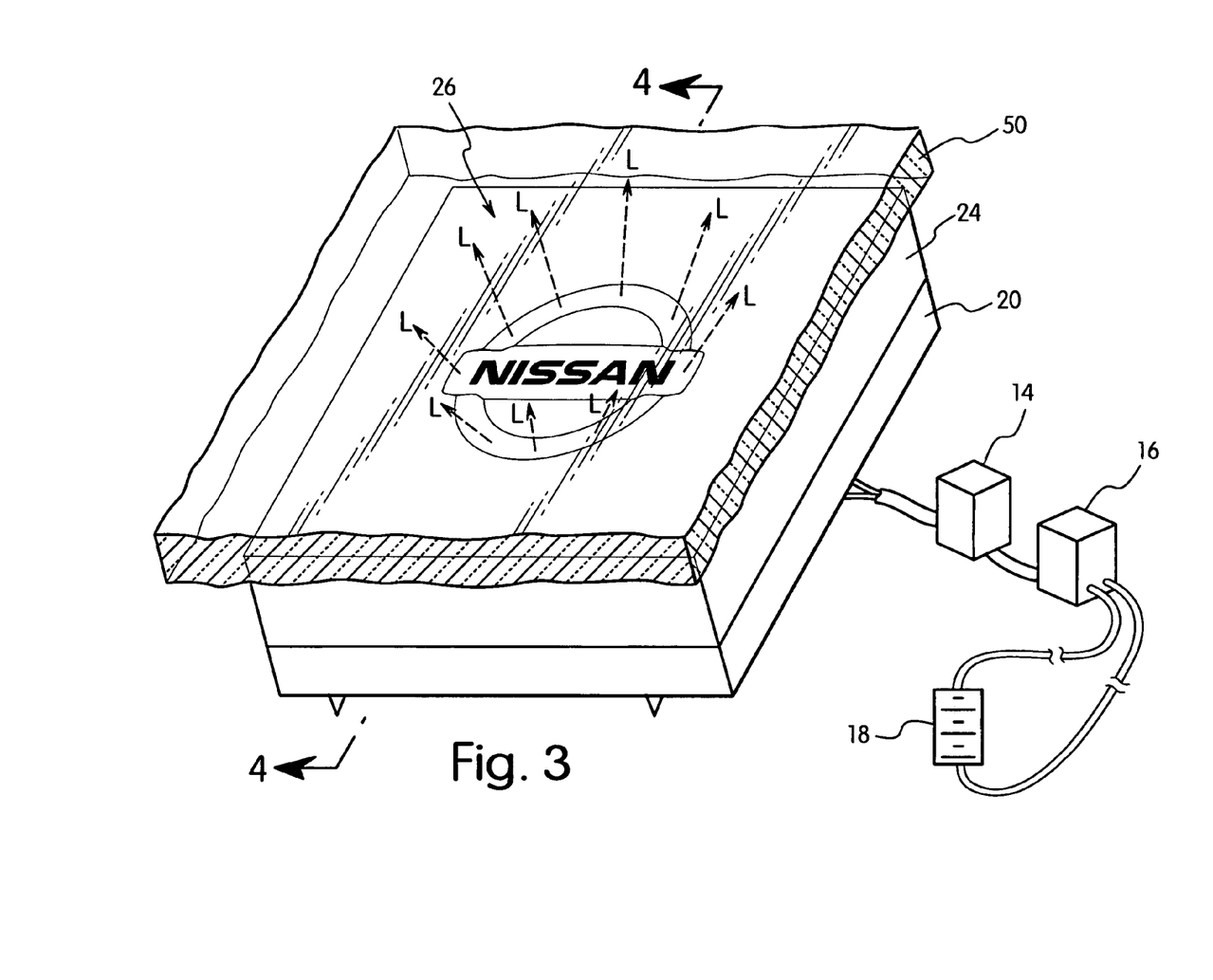
FIG. 3 is partial perspective view of one of the backlit panels and selected components of the vehicle in accordance with the present invention.

As seen in FIG. 3, the vehicle backlit panels 12 are electrically connected to an inverter 14, which in turn is electrically connected to a controller 16 and a vehicle power source 18. Basically, the vehicle backlit panels 12 are selectively turned on and off by the controller 16, which supplies electrical power from the vehicle power source 18. The inverter 14 is electrically connected between the vehicle backlit panels 12 and the vehicle power source 18 to convert DC power of the vehicle power source 18 to AC power. The controller 16 includes conventional circuitry that is electrically connected to one or more switches such that the vehicle backlit panels 12 can be either manually or automatically operated to selectively turn the vehicle backlit panels 12 on and off. For example, the controller 16 can be electrically connected to an ignition switch, a light detecting switch, a headlight switch and/or an interior light switch as needed and/or desired. Thus, the vehicle backlit panels 12 are either manually or automatically operated in response to conditions within the vehicle 10. In other words, the controller can be connected to any of a variety of switches and circuits within the vehicle 10 such that under predetermined conditions one or more of the vehicle backlit panels 12 is illuminated.

As shown in FIGS. 3-6, each of the vehicle backlit panels 12 basically includes a base substrate 20, an electroluminescent element 22 and an outer substrate 24. The electroluminescent element 22 is sandwiched in between the base substrate 20 and the outer substrate 24 such that an integrated interior vehicle trim component assembly is formed. The inverter 14 is electrically connected to the electroluminescent element 22 and converts DC power to AC power.

The controller 16 is configured and arranged to operate the electroluminescent element 22 in response to conditions within the vehicle 10 as mentioned above.

As explained below, the vehicle backlit panels 12 are configured to form a three-dimensional graphic image 26 with a three-dimensional look that is almost holographic in appearance. The three-dimensional graphic image 26 is preferably created without any printing of indicia or otherwise masking the light from the electroluminescent element 22. In particular, the three-dimensional graphic image 26 is preferably created solely by providing the outer substrate 24 with different thicknesses resulting in different translucency levels. In other words, by selectively decreasing the thickness of selected areas of the outer substrate 24, various symbols, letters, numbers and the like can be formed when the outer substrate 24 is properly backlit. The outer substrate 24 can be formed such that the three-dimensional graphic image 26 is visible only when the electroluminescent element 22 is turned on. Prior to illuminating the electroluminescent element 22, the indicia of the three-dimensional graphic image 26 can be invisible or appear as a two-dimensional graphic image 26.

Figure 6:
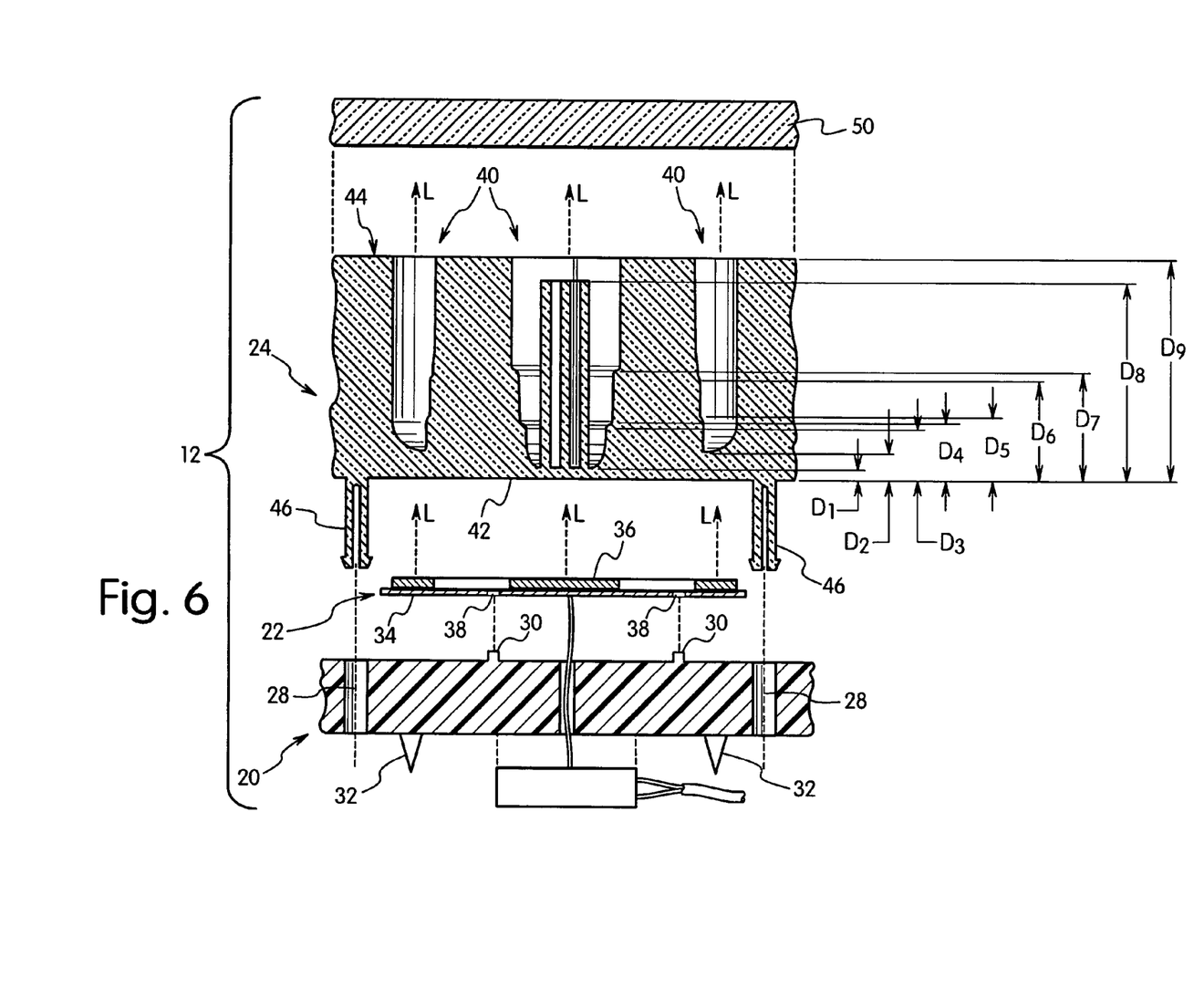
FIG. 6 is an exploded cross-sectional view of the backlit panel showing the various portions thereof, including an electroluminescent element, taken along the line 6-6 of FIG. 5 in accordance with the first embodiment of the present invention.

The base substrate 20 of the vehicle backlit panel 12 is preferably formed from a rigid material, such as metal, plastic or polymer materials that provides rigidity to the vehicle backlit panel 12. The base substrate 20 is preferably coated with a reflective material that reflects light from the electroluminescent element 22, thereby enhancing the illuminating characteristics of the electroluminescent element 22. The base substrate 20, as best shown in FIG. 6, is formed with a plurality of alignment apertures 28, a plurality of alignment pins 30 and a plurality of attachment portions 32. The alignment apertures 28 are provided to align and attach the base substrate 20 to the outer substrate 24 in a manner described in greater detail below. The alignment pins 30 are provided to align the electroluminescent element 22 with the base substrate 20. The attachment portions 32 are shown schematically in the drawings, but can be snaps, clips, springs, apertures for receiving fasteners, or fasteners that attach to corresponding attachment receiving members (not shown) formed in various portions of the vehicle 10.

The electroluminescent element 22 is preferably a generally planar panel or a thin film member that includes a support panel 34 and an electroluminescent material 36. The support panel 34 is a substrate that provides support for the electroluminescent material 36. The support panel 34 can be rigid or flexible, depending upon materials used, manufacturing techniques and design criteria. For example, the support panel 34 can be a rigid sheet material of plastic or metal, or the support panel 34 can be a flexible plastic film.

The support panel 34 is preferably formed with two apertures 38 that are dimensioned and located to receive the alignment pins 30 of the base substrate 20. The apertures 38 and the alignment pins 30 are arranged and configured to position the support panel 34 and the electroluminescent material 36 in registration with the three-dimensional graphic image 26. Consequently, the electroluminescent element 22 disposed on one side of the base substrate 20 and held in position by the alignment pins 30 of the base substrate 20.

The electroluminescent material 36 is preferably a conventional multilayered film that includes a first conductive material, phosphor and dielectric layers and a second conductive material. Typically, the phosphor and dielectric layers are sandwiched in between the first and second conductive materials. The first and second conductive materials are preferably translucent, and serve as electrodes. Thus, when AC current is supplied by the inverter 14, magnetic fields are generated between the first and second conductive materials cause the phosphor layer to produce light in a conventional manner.

Figure 7:
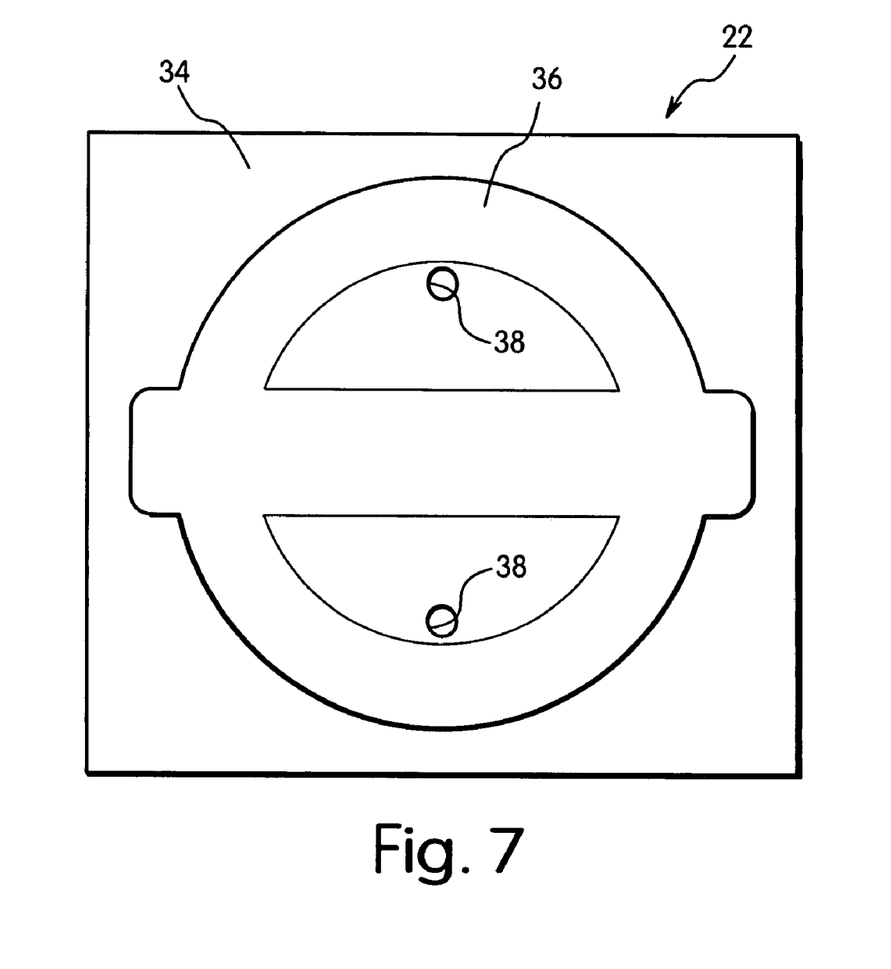
FIG. 7 is a top plan view of the electroluminescent element depicted in FIG. 6 in accordance with the first embodiment of the present invention.

The electroluminescent material 36 has a peripheral edge that conforms to an overall outline of the three-dimensional graphic image 26 of the outer substrate 24. Specifically, as shown in FIG. 7, the electroluminescent material 36 has the general shape and size of the three-dimensional graphic image 26. Therefore, once the electroluminescent element 22 is turned on, the electroluminescent material 36 only illuminates the three-dimensional graphic image 26 with the remaining portions of the outer substrate 24 being non-illuminated areas of the display.

The electroluminescent element 22 is confined between the base substrate 20 and the outer substrate 24. Since the base substrate 20 is covered with a reflective material, it does not permit the diffusion of light from the electroluminescent element 22 therethrough. Rather, light from the electroluminescent element 22 is reflected to the outer substrate 24. Therefore, when the electroluminescent element 22 is illuminated light travels generally in a direction of illumination L, as indicated in FIGS. 3 and 6.

Figure 4:
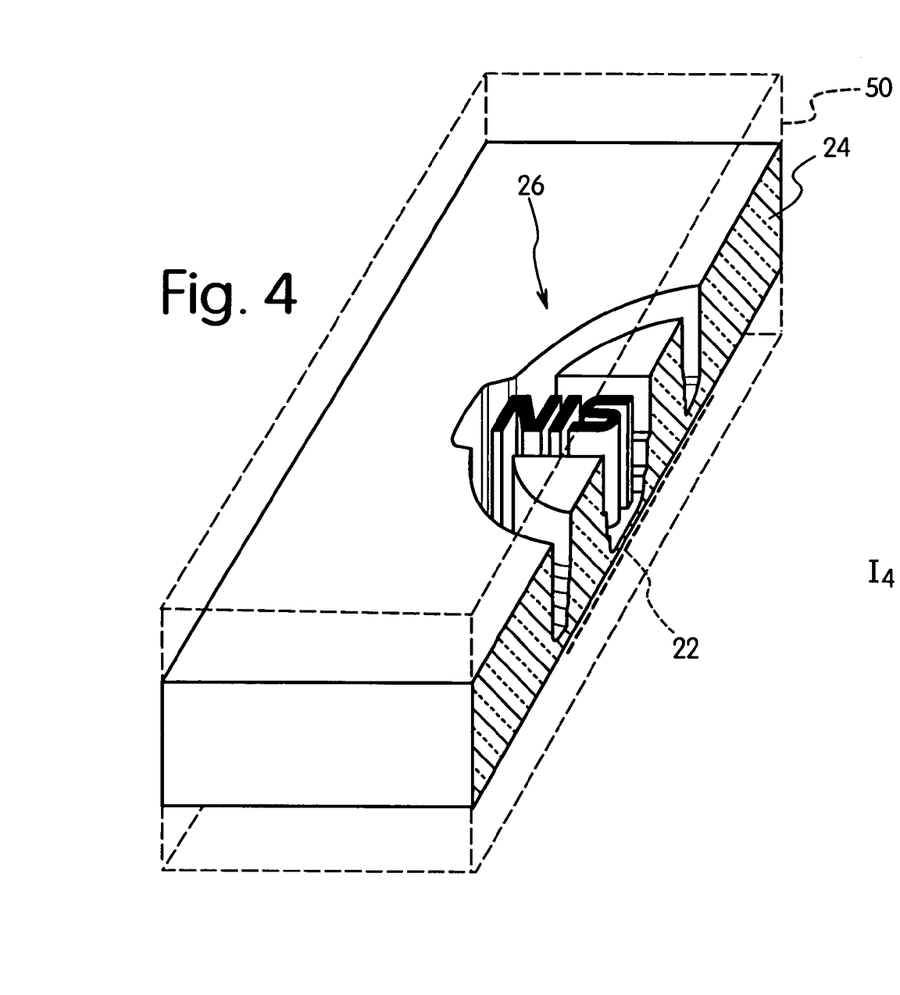
FIG. 4 is a cross-sectional perspective view of the backlit panel depicted in FIG. 3, as seen along section lines 4-4 of FIG. 3 in accordance with a first embodiment of the present invention.

The outer substrate 24 is now described in greater detail with specific reference to FIGS. 4 and 6. It should be understood from the drawings and the description herein that the thicknesses of the various portions of the outer substrate 24 and other portions of the vehicle backlit panel 12 have been intentionally distorted in order to highlight the various features of the three-dimensional graphic image 26. Specifically, the base substrate 20, the electroluminescent element 22 and especially the outer substrate 24 have been provided in FIG. 6 with exaggerated thicknesses. The actual relative thicknesses of the base substrate 20, the electroluminescent element 22 and the outer substrate 24 depend upon the luminescent properties of the materials used and design criteria.

The outer substrate 24 is preferably a molded member created in a mold that has been laser etched so that very minute dimensional thicknesses can be attained to create the three-dimensional graphic image 26. Of course, a blank piece of material can be laser etched to create the three-dimensional graphic image 26 as needed and/or desired. The outer substrate 24 can be constructed of a variety of materials that have a translucent property to carry out the present invention, such as translucent plastic or other translucent polymeric materials. Of course, the entire area of the outer substrate 24 does not need to be translucent. In other words, the outer substrate 24 can have non-translucent and/or transparent areas as needed and/or desired.

The outer substrate 24 overlies the electroluminescent element 22 such that at least a translucent substrate portion 40 is formed over the electroluminescent element 22 such that the electroluminescent element 22 can not be readily seen by the naked eye. The outer substrate 24 basically has a first surface 42, a second surface 44 and a plurality of alignment/attachment members 46. The translucent substrate portion 40 includes illumination areas of different thicknesses $D_1$, $D_2$, $D_3$, $D_4$, $D_5$, $D_6$, $D_7$, $D_8$ and $D_9$, as measured in the direction of illumination L through the outer substrate 24 to form the three-dimensional graphic image 26.

Specifically, as indicated in FIG. 6, the illumination areas have different thicknesses $D_1$, $D_2$, $D_3$, $D_4$, $D_5$, $D_6$, $D_7$, $D_8$ and $D_9$, as measured perpendicularly from the first surface 42. The illumination area with thicknesses $D_1$ is the smallest or thinnest of each of the illumination areas, while the illumination area with thicknesses $D_9$ is the thickest. More specifically, the following relationship of the illumination areas being illustrated as one example of the invention: $D_1<D_2<D_3<D_4<D_5<D_6<D_7<D_8<D_9$. The three-dimensional graphic image 26 has a three-dimensional appearance resulting from different translucency levels of the illumination areas of the translucent substrate portion 40 having the different thicknesses $D_1$, $D_2$, $D_3$, $D_4$, $D_5$, $D_6$, $D_7$, $D_8$ and $D_9$. The thinner the illumination area, the greater the amount of light that passes through or diffuses through that specific area to the second surface 44.

The first surface 42 of the outer substrate 24 is a generally planar surface that faces and contacts the electroluminescent element 22. Light emitted from the electroluminescent element 22 passes into the first surface 42 and illuminates corresponding portions of the translucent substrate portion 40 with different degrees of illumination, depending upon the relative thicknesses of each of the illumination areas. When the electroluminescent element 22 is illuminated, the translucent substrate portion 40 containing the three-dimensional graphic image 26 is visible through the second surface 44.

The translucent substrate portion 40 is preferably free of graphic images, such as printed images or the like that correspond to the three-dimensional graphic image 26. It should be understood that the translucent substrate portion 40 can alternatively be provided with a printed translucent graphic image corresponding to the three-dimensional graphic image 26. Although, in the preferred embodiment of the present invention, the three-dimensional graphic image 26 is not visible when the electroluminescent element 22 is not illuminated. The three-dimensional graphic image 26 is only visible when the electroluminescent element is illuminated.

The alignment/attachment members 46 extend from the first surface 42. The alignment/attachment members 46 are dimensioned and configured to extend into the alignment apertures 28 thereby aligning the outer substrate 24 with the base substrate 20. Further, the alignment/attachment members 46 fix the outer substrate 24 to the base substrate 20. As such, the outer substrate 24 and the base substrate 20 include mating fastener structures to fixedly couple the outer substrate 24 and the base substrate 20 together. Specifically, the alignment/attachment members 46 and the alignment apertures 28 are mating fastener structures that create a snap-fit arrangement to fixedly couple the outer substrate 24 and the base substrate 20 together. It should be understood from the drawings and the description that the alignment pins 30 and the alignment/attachment members 46 can be combined such that the alignment/attachment members 46 provide alignment for the electroluminescent element 22.

As mentioned above, the second surface 44 of the outer substrate 24 is a generally contoured surface that faces away from the electroluminescent element 22. The contour of the second surface 44 is defined by the illumination areas with the different thicknesses $D_1$, $D_2$, $D_3$, $D_4$, $D_5$, $D_6$, $D_7$, $D_8$ and $D_9$ as measured between the first surface 42 (the generally planar side surface) and the second surface 44 (the contoured side surface).

Portions of the second surface 44 can additionally be contoured to match the surrounding portion of the vehicle 10. For instance, if the backlit panel 12 is installed within the interior of the vehicle 10, portions of the second surface 44 can include a contoured shape to match the adjacent interior portions of the vehicle 10.

As shown in FIGS. 3, 4 and 6, the second surface 44 is optionally covered by an outer cover material 50 overlying the outer substrate 24. The outer cover material 50 can include a translucent or transparent trim portion overlying the three-dimensional graphic image 26 of the translucent substrate portion 40. The outer cover material 50 can be made of any of a variety of materials depending upon the positioning of the backlit panel 12. The outer cover material 50 can be made of any material that allows diffusion of light from the backlit panel 12 thereby showing the backlit three-dimensional graphic image 26 when illuminated. For instance, where the backlit panel 12 is installed on an exterior portion of the vehicle 10, as shown in FIG. 1, the outer cover material 50 can be a plastic or glass cover material chosen to withstand outside weather conditions. Alternatively, with the backlit panel 12 is installed on an interior portion of the vehicle 10, as shown in FIG. 2, the outer cover material 50 can be an interior decorative material to match the dashboard or steering wheel of the vehicle 10. It should be understood that the outer cover material 50 is optional and is not required in order to practice the first embodiment of the present invention. Further the outer cover material 50 can alternatively be provided with a printed translucent graphic image corresponding to the three-dimensional graphic image 26. However, in the preferred embodiment no such printed translucent graphic image is provided on either the optional outer cover material 50 or the translucent substrate portion 40. Therefore, in the preferred embodiment of the present invention, the three-dimensional graphic image 26 is not visible when the electroluminescent element 22 is not illuminated. The three-dimensional graphic image 26 is visible when the electroluminescent element is illuminated.

As mentioned above, the thickness of the outer substrate 24 is exaggerated in the drawings. It should be understood that with the outer cover material 50 installed on the backlit panel 12, the three-dimensional graphic image 26 is not visible when the electroluminescent element 22 is not illuminated. Furthermore, if the outer cover material 50 is not included, the illumination areas having different thicknesses $D_1$, $D_2$, $D_3$, $D_4$, $D_5$, $D_6$, $D_7$, $D_8$ and $D_9$ are noticeable to the touch, but are not necessarily visible enough to allow recognition of all aspects of the three-dimensional graphic image 26.

Figure 5:
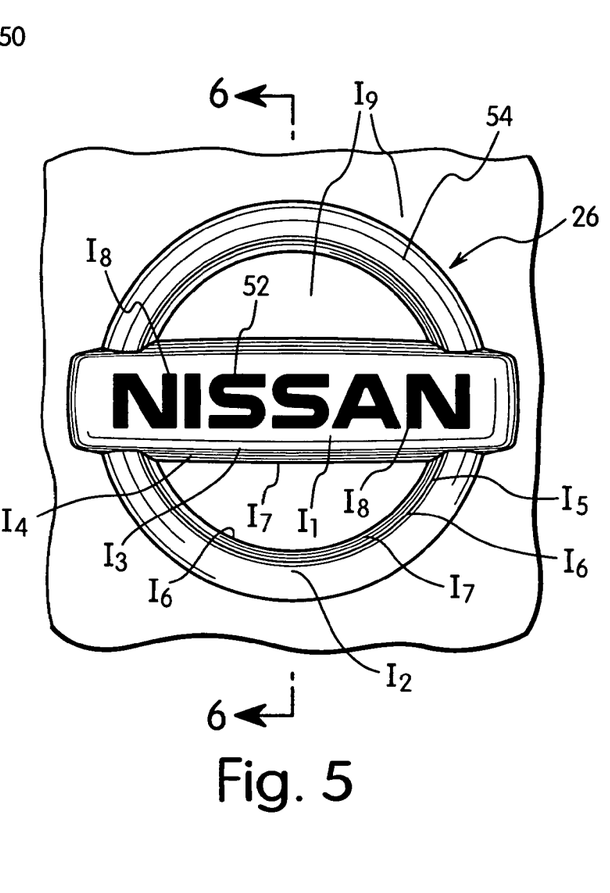
FIG. 5 is a top plan view of the backlit panel in FIGS. 3 and 4 in accordance with the first embodiment of the present invention.

As shown in FIG. 5, the three-dimensional graphic image 26 of the outer substrate 24 can be formed with at least one of an alphabetical character 52 and a numerical symbol 54. Specifically the alphabetical character 52 can be a letter or letters that, for example, spell out a company name, model name or other desired logo. The numeric symbol 54 can be any number, but as shown in FIG. 5, the numeric symbol 54 is the number zero which at least partially encircles the alphabetical characters 52.

When illuminated, the three-dimensional graphic image 26 allows light to pass through portions thereof with a variety of light intensities due to the illumination areas having different thicknesses $D_1$, $D_2$, $D_3$, $D_4$, $D_5$, $D_6$, $D_7$, $D_8$ and $D_9$ of the translucent substrate portion 40. Specifically, when illuminated by the electroluminescent element 22 the three-dimensional graphic image 26 is visible with light intensities $I_1$, $I_2$, $I_3$, $I_4$, $I_5$, $I_6$, $I_7$, $I_8$ and $I_9$, respectively, corresponding to the illumination areas having different thicknesses $D_1$, $D_2$, $D_3$, $D_4$, $D_5$, $D_6$, $D_7$, $D_8$ and $D_9$.

Specifically, the illumination areas having different thicknesses $D_1$, $D_2$, $D_3$, $D_4$, $D_5$, $D_6$, $D_7$, $D_8$ and $D_9$ define differing translucency levels of the translucent substrate portion 40. Further, each of the light intensities $I_1$, $I_2$, $I_3$, $I_4$, $I_5$, $I_6$, $I_7$, $I_8$ and $I_9$ corresponds to a differing translucency level. For example, the illumination area having thickness $D_9$ is relatively thick compared to other illumination areas, therefore the light intensity $I_9$ (translucency level) is very low or dark when the electroluminescent element 22 is lit. The illumination area having thickness $D_8$ is thinner than the illumination area with thickness $D_9$ but thicker than other areas. Therefore the light intensity $I_8$ (translucency level) will be brighter than light intensity $I_9$ but darker than light intensities $I_1$, $I_2$, $I_3$, $I_4$, $I_5$, $I_6$ and $I_7$. Similarly, each of the light intensities $I_1$, $I_2$, $I_3$, $I_4$, $I_5$, $I_6$ and $I_7$ is brighter than adjacent areas with a greater thickness. The following light intensity (translucency level) relationship preferably applies: $I_1 > I_2 > I_3 > I_4 > I_5 > I_6 > I_7 > I_8 > I_9$.

The outer substrate 24 can be made in any of a variety of ways. Preferably, a mold is laser etched to form the reverse of the final desired three-dimensional graphic image 26. A desired material is poured or pressed into the mold and cures or cools to conform to the shape of the three-dimensional graphic image 26 thereby forming the outer substrate 24. The desired material can be a plastic or polymer material having the desired translucency characteristics to form the translucent substrate portion 40 of the outer substrate 24. Once formed, the outer substrate 24 is removed and assembled into the backlit panel 12.

Second Embodiment

Figure 8:
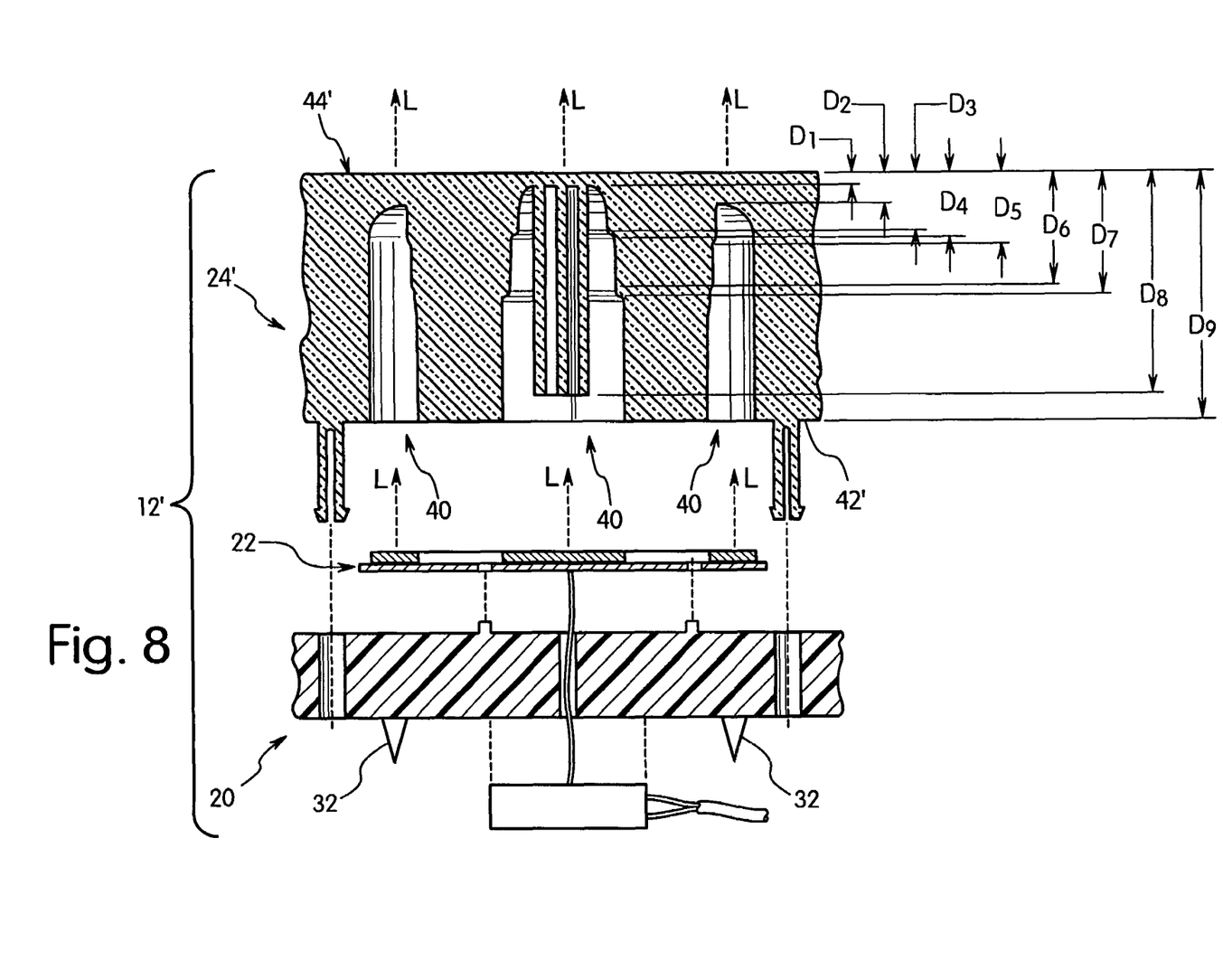
FIG. 8, is an exploded cross-sectional view of a backlit panel similar to FIG. 6 in accordance with a second embodiment of the present invention.

Referring now to FIG. 8, a backlit panel 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or a double prime (").

In the second embodiment, an outer substrate 24' is generally the same as the outer substrate 24 of the first embodiment, except that a first surface 42' is formed with the alignment/attachment members 46 and a second surface 44' forms an outer surface of the backlit panel 12. The optional outer cover material 50 of the first embodiment is not necessary with the backlit panel 12' in the second embodiment.

Further, the first surface 42' of the second embodiment is a contoured surface that includes the illumination areas having different thicknesses $D_1$, $D_2$, $D_3$, $D_4$, $D_5$, $D_6$, $D_7$, $D_8$ and $D_9$. The areas of different thicknesses $D_1$, $D_2$, $D_3$, $D_4$, $D_5$, $D_6$, $D_7$, $D_8$ and $D_9$ are measured instead from the second surface 44'. As well, the first surface 42' (the contoured surface) faces the electroluminescent element 22. The second surface 44' is a generally planar surface that faces away from the electroluminescent element 22. As such, the translucent substrate portion 40 has a translucency such that the three-dimensional graphic image 26 of the outer substrate 24' is completely invisible therethrough when the electroluminescent element 22 is not illuminated. The three dimensional graphic image 26 is only visible through the translucent substrate 40 when the electroluminescent element 22 is illuminated.

The various portions and elements of the vehicle 10 are conventional components that are well known in the art. Since the various portions and elements of the vehicle 10 are well known in the art, these structures will not be discussed or illustrated in detail herein. Rather, it will be apparent to those skilled in the art from this disclosure that the components can be any type of structure and/or programming that can be used to carry out the present invention.

As used herein to describe the above embodiments, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle backlit panel comprising:

a base substrate;

an electroluminescent element disposed on one side of the base substrate; and an outer substrate overlying the electroluminescent element, the outer substrate including a translucent substrate portion having a planar side surface and a contoured side surface, the translucent substrate portion having a plurality of areas of different thicknesses as measured between the planar side surface and the contoured side surface in a direction of illumination of light from the electroluminescent element through the outer substrate to form a three-dimensional graphic image with a three-dimensional appearance resulting from different translucency levels of the plurality of areas of different thicknesses, with the direction of illumination being generally perpendicular to both the planar side surface and the contoured side surface.

2. The vehicle backlit panel as set forth in claim 1, wherein the translucent substrate portion of the outer substrate is free of graphic images that correspond to the three-dimensional graphic image so that three-dimensional graphic image is invisible when the electroluminescent element is not illuminated and visible when the electroluminescent element is illuminated.

3. A vehicle backlit panel comprising:

a base substrate;

an electroluminescent element disposed on one side of the base substrate; and an outer substrate overlying the electroluminescent element, the outer substrate including a translucent substrate portion having a plurality of areas of different thicknesses as measured in a direction of illumination of light from the electroluminescent element through the outer substrate to form a three-dimensional graphic image with a three-dimensional appearance resulting from different translucency levels of the plurality of areas of different thicknesses, the outer substrate having a generally planar side surface and a contoured side surface that forms the plurality of areas of different thicknesses as measured between the generally planar side surface and the contoured side surface, with the direction of illumination being generally perpendicular to both the generally planar side surface and the contoured side surface.

4. The vehicle backlit panel as set forth in claim 3, wherein
the generally planar side surface of the outer substrate faces the electroluminescent element and the contoured side surface of the outer substrate faces away from the electroluminescent element.

5. The vehicle backlit panel as set forth in claim 3, wherein
the generally planar side surface of the outer substrate faces away from the electroluminescent element and the contoured side surface of the outer substrate faces the electroluminescent element.

6. The vehicle backlit panel as set forth in claim 1, wherein
an outer cover material overlying the outer substrate, the outer material including a translucent trim portion overlying the three-dimensional graphic image of the translucent substrate portion.

7. The vehicle backlit panel as set forth in claim 1, wherein
the translucent substrate portion has a translucency such that the three-dimensional graphic image of the outer substrate is invisible therethrough when the electroluminescent element is not illuminated and visible therethrough when the electroluminescent element is illuminated.

8. The vehicle backlit panel as set forth in claim 1, wherein
the outer substrate and the base substrate include mating fastener structures to fixedly couple the outer substrate and the base substrate together.

9. The vehicle backlit panel as set forth in claim 8, wherein
the mating fastener structures are configured to create a snap-fit arrangement to fixedly coupled the outer substrate and the base substrate together.

10. The vehicle backlit panel as set forth in claim 1, wherein
the electroluminescent element is a generally planar panel.

11. The vehicle backlit panel as set forth in claim 1, wherein
the base substrate and the electroluminescent element includes mating alignment structures for aligning the base substrate and the electroluminescent element together.

12. The vehicle backlit panel as set forth in claim 1, wherein
the electroluminescent element has a peripheral edge that conforms to an overall outline of the three-dimensional graphic image of the outer substrate.

13. The vehicle backlit panel as set forth in claim 1, wherein
the three-dimensional graphic image of the outer substrate is formed with at least one of an alphabetical character and a numerical symbol.

14. The vehicle backlit panel as set forth in claim 1, wherein
the planar side surface of the outer substrate facing faces the electroluminescent element and the contoured side surface of the outer substrate faces away from the electroluminescent element.

15. The vehicle backlit panel as set forth in claim 1, wherein
the contoured side surface of the outer substrate faces the electroluminescent element.

16. The vehicle backlit panel as set forth in claim 3, further comprising:
an outer cover material overlying the outer substrate, the outer material including a translucent trim portion overlying the three-dimensional graphic image of the translucent substrate portion.

17. The vehicle backlit panel as set forth in claim 3, wherein
the translucent substrate portion has a translucency such that the three-dimensional graphic image of the outer substrate is invisible therethrough when the electroluminescent element is not illuminated and visible therethrough when the electroluminescent element is illuminated.

18. The vehicle backlit panel as set forth in claim 3, wherein
the electroluminescent element is a generally planar panel.

19. The vehicle backlit panel as set forth in claim 3, wherein
the base substrate and the electroluminescent element includes mating alignment structures for aligning the base substrate and the electroluminescent element together.

20. The vehicle backlit panel as set forth in claim 3, wherein
the three-dimensional graphic image of the outer substrate is formed with at least one of an alphabetical character and a numerical symbol.

21. The vehicle backlit panel as set forth in claim 3, wherein
the electroluminescent element includes electroluminescent material having a prescribed shape in registration with the plurality of areas of different thicknesses of the translucent substrate portion of the outer substrate.

22. The vehicle backlit panel as set forth in claim 1, wherein
the electroluminescent element includes electroluminescent material having a prescribed shape in registration with the plurality of areas of different thicknesses of the translucent substrate portion of the outer substrate.

23. The vehicle backlit panel as set forth in claim 1, wherein
the electroluminescent element includes an electroluminescent material provided proximate the plurality of areas of different thicknesses of the translucent substrate portion of the outer substrate.

24. A vehicle backlit panel comprising:
a base substrate;
an electroluminescent element disposed on one side of the base substrate, the electroluminescent element having an electroluminescent material having a generally uniform thickness and a prescribed two dimensional shape; and
an outer substrate overlying the electroluminescent element, the outer substrate including a translucent substrate portion having a plurality of areas of different thicknesses as measured in a direction of illumination of light emitted by the electroluminescent element, the areas of different thicknesses being in registration with the prescribed shape of the electroluminescent material such that the plurality of areas of different thicknesses are measured parallel to the direction of illumination.

* * * * *